United States Patent
Gelb

(10) Patent No.: US 8,191,691 B2
(45) Date of Patent: Jun. 5, 2012

(54) DISC BRAKE DEBRIS COLLECTION SYSTEM

(76) Inventor: Joseph Gelb, Moreno Valley, CA (US)

( * ) Notice: Subject to any disclaimer, the term of this patent is extended or adjusted under 35 U.S.C. 154(b) by 814 days.

(21) Appl. No.: 12/254,236

(22) Filed: Oct. 20, 2008

(65) Prior Publication Data

US 2010/0096226 A1 Apr. 22, 2010

(51) Int. Cl.
F16D 65/847 (2006.01)
(52) U.S. Cl. ............. 188/264 AA; 188/264 R; 188/71.6
(58) Field of Classification Search ............... 188/264 R, 188/264 A, 264 AA, 71.6, 264 P; 74/13.11; F16D 65/00
See application file for complete search history.

(56) References Cited

U.S. PATENT DOCUMENTS

| | | |
|---|---|---|
| 4,440,270 A | 4/1984 | Ross |
| 4,456,099 A | 6/1984 | Kawaguchi |
| 4,484,667 A | 11/1984 | Bottieri, Jr. |
| 4,503,944 A | 3/1985 | Burckhardt et al. |
| 4,561,522 A * | 12/1985 | Dayen .......................... 188/71.6 |
| 4,592,452 A * | 6/1986 | Merle .................... 188/264 AA |
| 4,620,616 A | 11/1986 | Martin |
| 4,772,299 A | 9/1988 | Bogusz |
| 4,846,315 A | 7/1989 | Dayen |
| 5,162,053 A | 11/1992 | Kowalski |
| 5,215,168 A * | 6/1993 | Guiot et al. .................. 188/71.6 |
| 5,284,227 A | 2/1994 | Pelfrey |
| 5,772,286 A | 6/1998 | Jordan |
| 5,878,848 A | 3/1999 | Zhang |
| 6,155,650 A | 12/2000 | Barger |
| 6,173,821 B1 | 1/2001 | Herffurth |
| 6,260,669 B1 | 7/2001 | Daudi |
| 6,315,091 B1 | 11/2001 | Nilsen |
| 6,357,563 B1 * | 3/2002 | Hayford et al. ............ 188/264 A |
| 6,371,569 B1 | 4/2002 | Dean |
| 6,419,056 B1 | 7/2002 | Dyko |
| 6,446,766 B1 | 9/2002 | Cornolti |
| 6,536,564 B1 | 3/2003 | Garfinkel |
| 6,578,678 B2 | 6/2003 | Lee |
| 6,592,642 B2 | 7/2003 | Maricq |
| 6,722,476 B1 | 4/2004 | Cornolti |
| 6,796,405 B2 | 9/2004 | Ruiz |

(Continued)

FOREIGN PATENT DOCUMENTS

JP 55115635 9/1980

(Continued)

OTHER PUBLICATIONS

International Search Report and Written Opinion in PCT/US2009/061170, dated Jun. 4, 2010.

*Primary Examiner* — Bradley King
*Assistant Examiner* — Thomas Irvin
(74) *Attorney, Agent, or Firm* — Kirk A. Buhler; Buhler & Associates

(57) ABSTRACT

A disc brake assembly includes a rotor, a caliper, brake pads and an optional filter. The optional filter can be disposed within a shroud which covers at least about 70% of the distal side periphery on at least one of the two sides of the rotor. The disc brake also includes an impeller or other means for providing air flow to the disc brake assembly. The impeller can be provided by the rotor itself or it can be provided by a separate component which is powered either directly or indirectly by the rotor.

14 Claims, 20 Drawing Sheets

U.S. PATENT DOCUMENTS

| | | |
|---|---|---|
| 6,857,510 B2 | 2/2005 | Schneider |
| 6,880,683 B1 | 4/2005 | Miles |
| 6,932,199 B2 | 8/2005 | Emmett |
| 6,962,242 B2 | 11/2005 | Conti |
| 7,059,456 B2 | 6/2006 | Winkelmann |
| 7,094,268 B2 | 8/2006 | Krantz |
| 7,111,710 B2 | 9/2006 | O'Rourke |
| 2001/0032758 A1 | 10/2001 | Ruiz |
| 2001/0032759 A1 | 10/2001 | Deibel |
| 2002/0017435 A1 | 2/2002 | Feldmann |
| 2002/0023810 A1 | 2/2002 | Hasegawa |
| 2002/0038742 A1 | 4/2002 | Bunker |
| 2002/0084150 A1 | 7/2002 | Lee |
| 2002/0166740 A1 | 11/2002 | Zhang |
| 2003/0006107 A1 | 1/2003 | Tsai |
| 2003/0173166 A1 | 9/2003 | Garfinkel |
| 2003/0221918 A1 | 12/2003 | Lin |
| 2004/0124046 A1 | 7/2004 | Hayes |
| 2004/0216264 A1* | 11/2004 | Shaver et al. ................ 15/344 |
| 2004/0216968 A1 | 11/2004 | Donadoni |
| 2005/0056495 A1 | 3/2005 | Greppi |
| 2005/0126868 A1 | 6/2005 | Lee |
| 2005/0145452 A1 | 7/2005 | Yamamoto |
| 2005/0183909 A1 | 8/2005 | Rau |
| 2006/0049011 A1 | 3/2006 | Jacob |
| 2006/0086579 A1 | 4/2006 | Gerber |
| 2006/0243547 A1 | 11/2006 | Keller |
| 2008/0257666 A1 | 10/2008 | Gelb |

FOREIGN PATENT DOCUMENTS

| | | |
|---|---|---|
| JP | 58088237 | 5/1983 |
| JP | 59200821 | 11/1984 |
| JP | 08086325 | 4/1996 |
| JP | 2008196684 | 8/2008 |
| KR | 10200401014757 | 12/2004 |

* cited by examiner

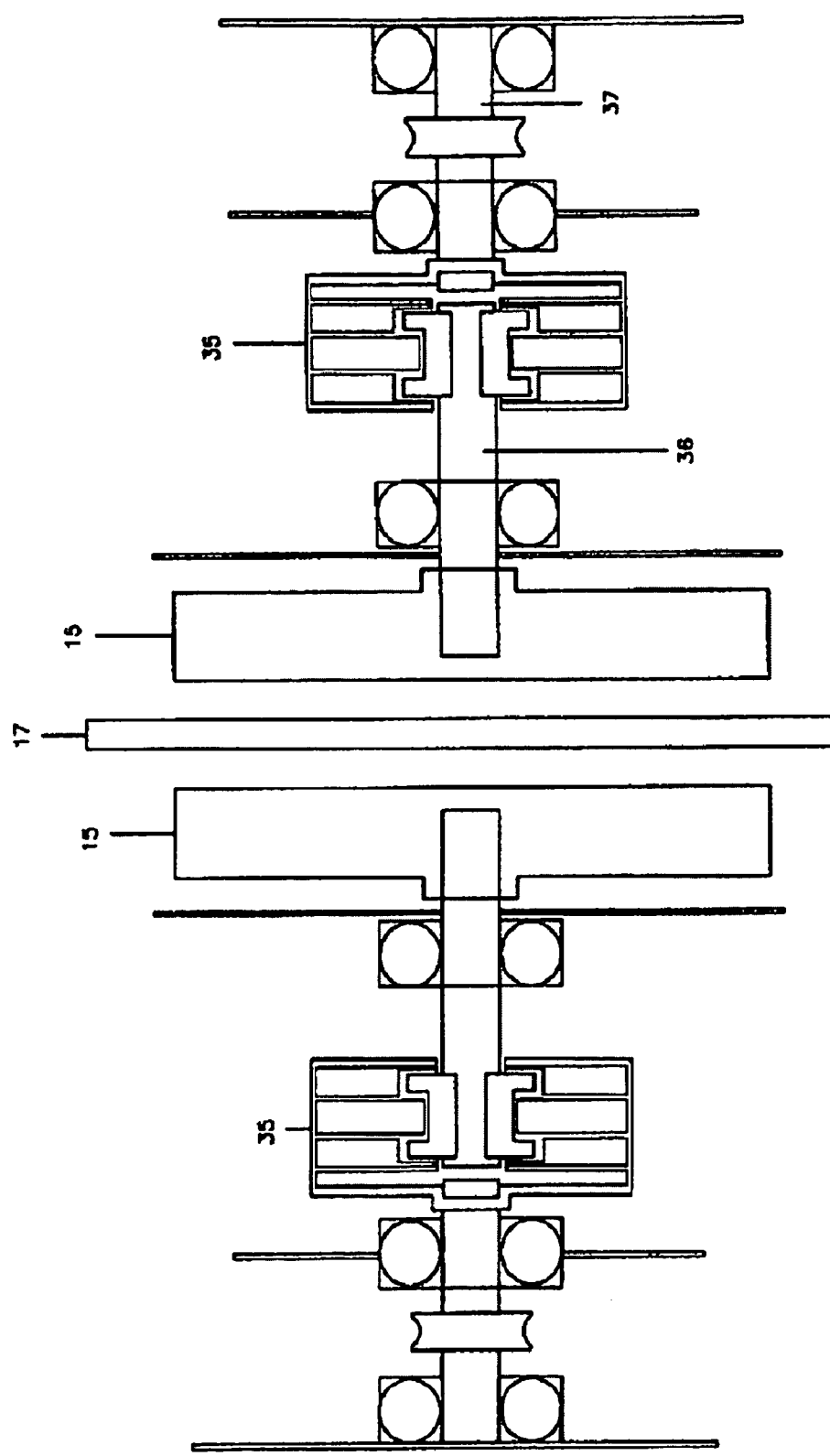

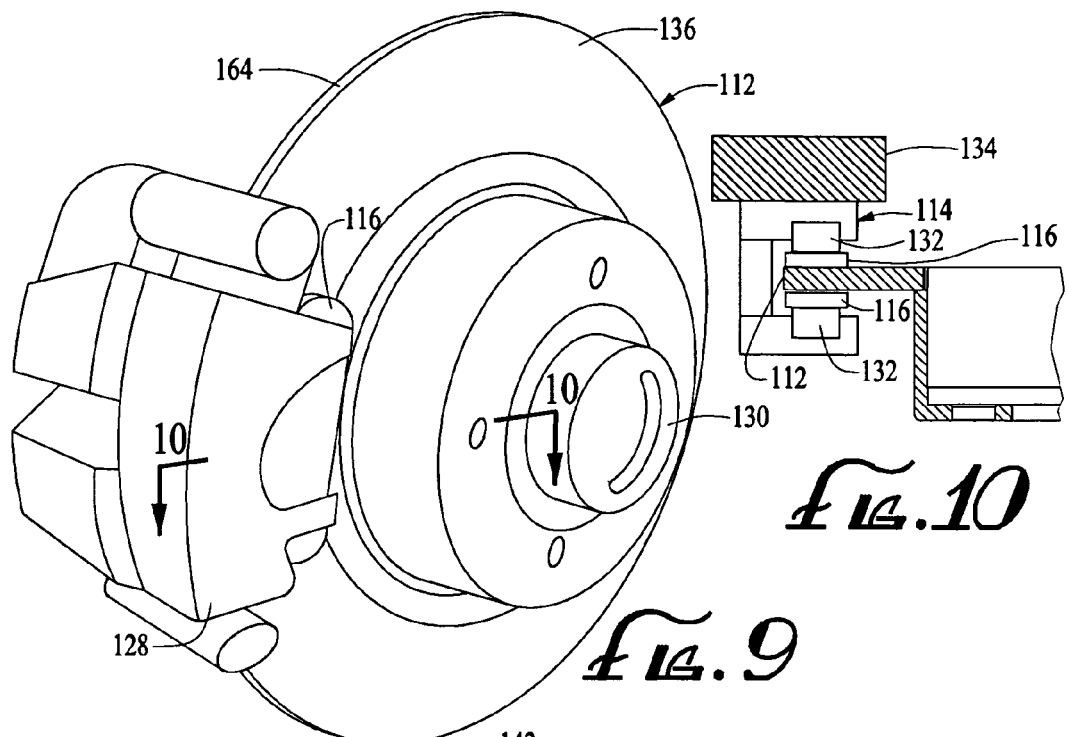
FIG. 10
FIG. 9
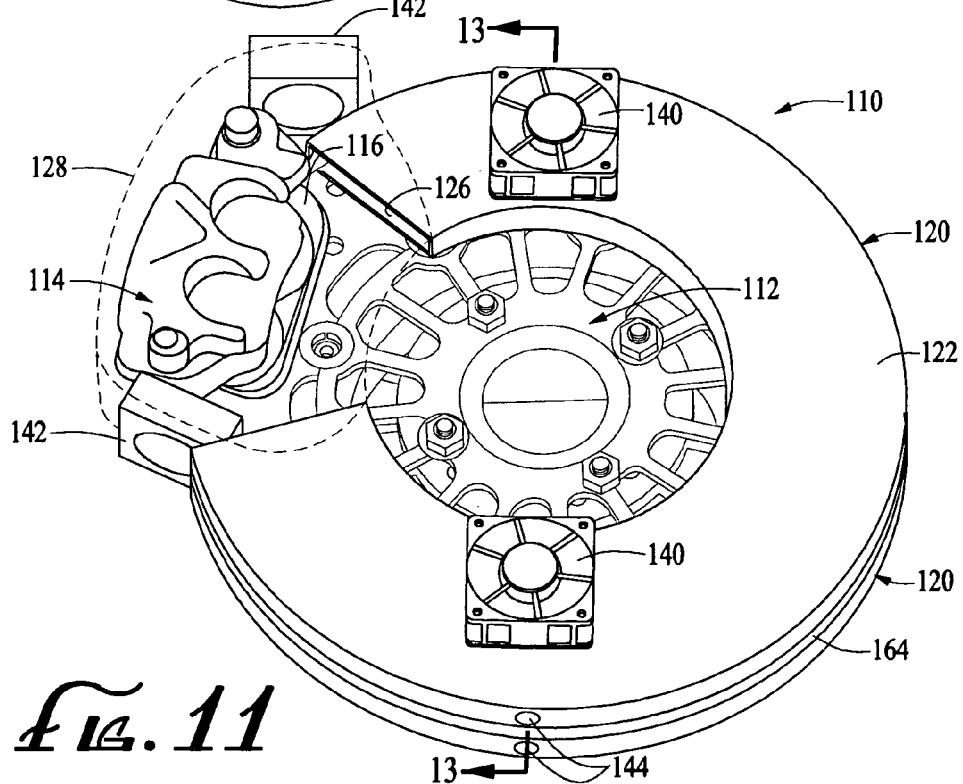
FIG. 11

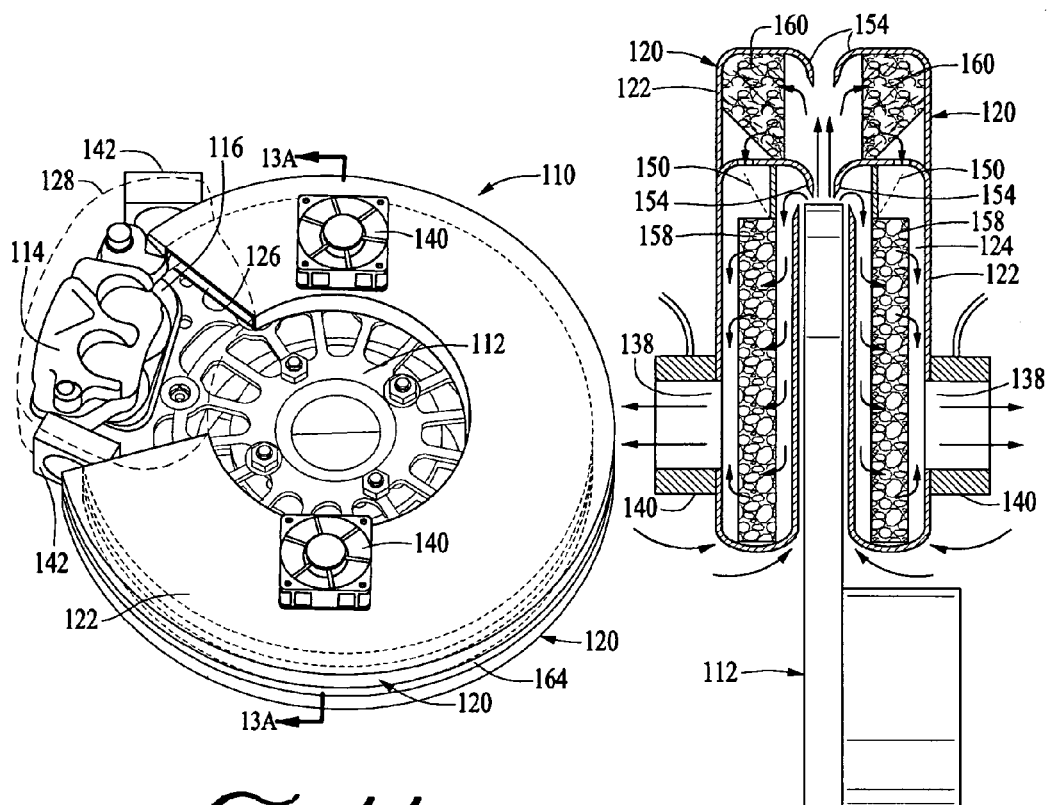
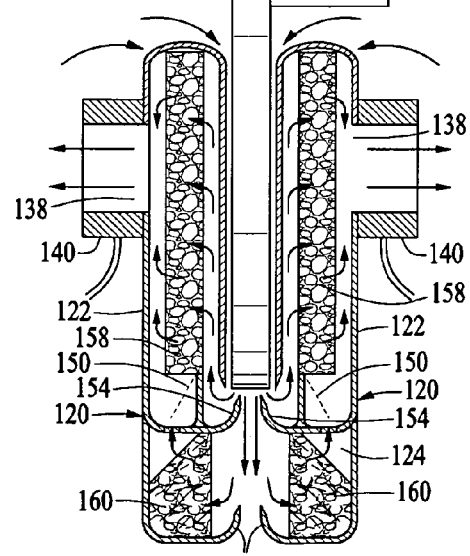

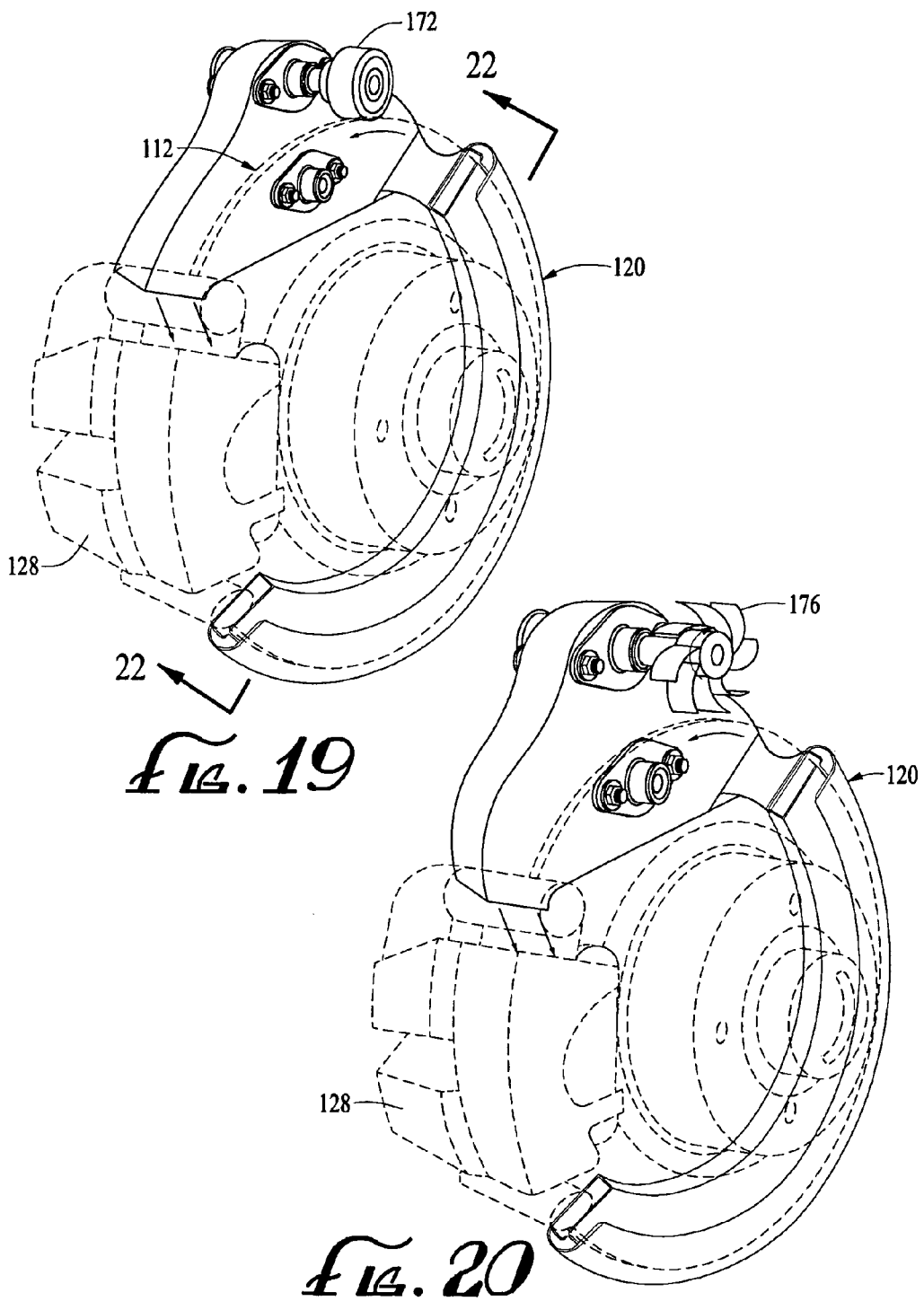

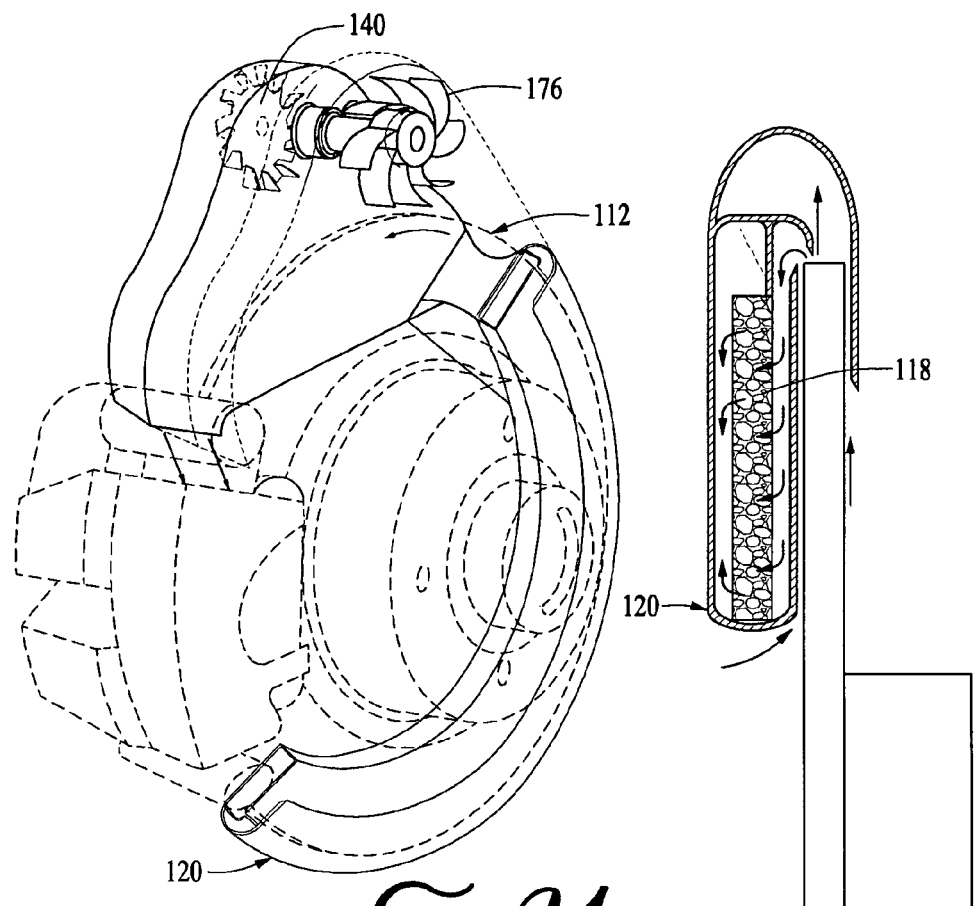
*fig. 21*
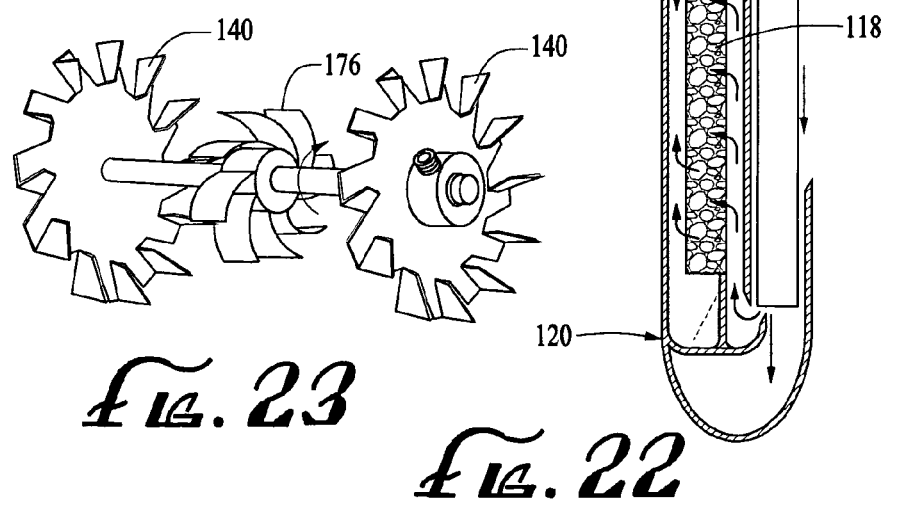
*fig. 23*
*fig. 22*

DISC BRAKE DEBRIS COLLECTION SYSTEM

FIELD OF THE INVENTION

The present invention is directed to a disc brake assembly and, in some embodiments, to a system for cooling disc brakes and/or for collecting friction material waste particle discharge from brake pads in disc brake assemblies.

BACKGROUND OF THE INVENTION

Disc brake systems are the most common form of braking mechanisms used today for vehicle wheels and most specifically for mass produced motorcycles and automobiles. Disc braking systems work by utilizing brake pads which are compressed against a rotor (also called a disc) to slow down a vehicle's wheels. As a by-product of this system, a large amount of heat is released as the kinetic energy from the wheel momentum is converted by the friction created by the brake pads. Additionally, as brake pads erode, they release harmful particles into the atmosphere. These harmful particles can also enter and pollute water streams. The present invention addresses and alleviates these common problems.

Cooling is a primary concern for disc braking systems. This is because at high temperatures, the coefficient of friction needed for stopping power is reduced and brake performance is consequently diminished. For this reason, most disc systems include vanes that facilitate air to flow through the rotor and remove heat from the surface. To that end, many U.S. patents have also been directed towards devices that provide cooling air to reduce the operating temperature of braking systems. These include U.S. Pat. Nos. 4,620,616, 4,503,944, 3,664,467, 4,317,508, 6,446,766 and 4,440,270. Some U.S. patents have also focused on the use of fans or impellers to aide in airflow. These include U.S. Pat. Nos. 6,880,683, 4,846,315, 7,111,710 and 4,013,146.

The waste particles that are released into the atmosphere from brake pads also creates multiple dilemmas. As force is applied to brake pads, the material on the pads is ground away. This material is known as brake dust and can be problematic for two main reasons. The first is that brake dust is highly corrosive and harmful to the environment. It is estimated that up to ninety percent of the worn away brake pad particles are released into the atmosphere. The dust particles created, which contains copper, brass, Kevlar, carbon fibers, metal filings to name a few and acidic adhesive material, is extremely caustic to the environment. The second problem is that the remainder of the brake dust particles that are not released into the atmosphere is deposited on the vehicle wheels. The brake dust particles can be corrosive enough to burn through wheel coatings and leave expensive wheels damaged and unsightly. As a result, there have been a number of devices that have introduced dust shields or filter systems designed to reduce brake dust. These include U.S. Pat. Nos. 7,094,268, 4,484,667, 6,371,569, 6,173,821, 6,932,199, 6,155,650 and 5,772,286. U.S. Pat. No. 5,162,053 discloses a system that utilizes a suction mechanism along with a filter to capture brake dust. Finally, U.S. Pat. No. 6,592,642 discloses a device that utilizes an electrostatic charge to collect charged brake dust particles.

None of the above-referenced devices addresses all the problems associated with brake pad waste. Therefore, there is a need for a system that can provide additional cooling air to brake rotors, prevent harmful brake dust particles from being discharged into the atmosphere, and protect the finish on vehicle wheels from being damaged. Accordingly, the present invention described herein encompasses these and other elements.

SUMMARY OF THE INVENTION

In one aspect of the invention, a system is provided for increasing the air flow to a disc brake assembly, said system comprising a main housing, a drive shaft, said drive shaft positioned to be powered by a rotor from a disc brake assembly, at least one impeller, said impeller positioned to be powered by said drive shaft, said impeller capable of being turned to draw the airflow from a rotor of a disc brake assembly, and at least one impeller housing, said impeller housing holding said impeller and having an airflow inlet and an airflow outlet, said airflow outlet positioned so that exiting airflow is directed to cool a rotor of a disc brake assembly. Typically in this aspect of the invention, the system further comprises at least one filter for capturing and retaining waste particles discharge from the brake pads.

In another aspect of the invention, a disc brake assembly is provided which comprises a rotor, a caliper and brake pads attached to the caliper. The rotor has a first distal side periphery, a second distal side periphery and a distal edge periphery. The disc brake assembly further comprises a filter disposed within the shroud. The shroud has a pair of opposed side walls, a pair of opposed shroud end openings and a shroud interior. The shroud is disposed proximate to the rotor so as to cover at least about 70% of at least one distal side periphery. Typically, a shroud is disposed on both sides of the rotor such that at least about 70% of both distal side peripheries are covered by the two shrouds.

DESCRIPTION OF THE DRAWINGS

These and other features, aspects and advantages of the present invention will become better understood with reference to the following description, appended claims and accompanying drawings where:

FIG. 7 is an exploded view of an alternative embodiment of a disc brake assembly having features of the invention, showing an impeller assembly with a reverse centrifugal clutch configuration;

FIG. 9 is a perspective view of another disc brake assembly having features of the invention;

FIG. 10 is a cross-sectional detail view of the disc brake assembly illustrated in FIG. 9, taken along line 10-10;

FIG. 11 is a perspective view of another embodiment having features of the invention;

FIG. 11A is a perspective view of an alternative embodiment of that which is illustrated in FIG. 11;

FIG. 13A is a cross-sectional view of the embodiment illustrated in FIG. 11A taken alone line 13A-13A;

FIG. 19 is perspective view of another embodiment having features of the invention;

FIG. 21 is perspective view of another embodiment having features of the invention;

FIG. 22 is a cross-sectional view of the embodiment illustrated in FIG. 19 taken along line 22-22;

FIG. 23 is a detail view of an impeller assembly useable in the invention;

FIG. 26 is a cross-sectional view of a pressure release valve useable in the invention.

DESCRIPTION OF THE INVENTION

Figure 1:
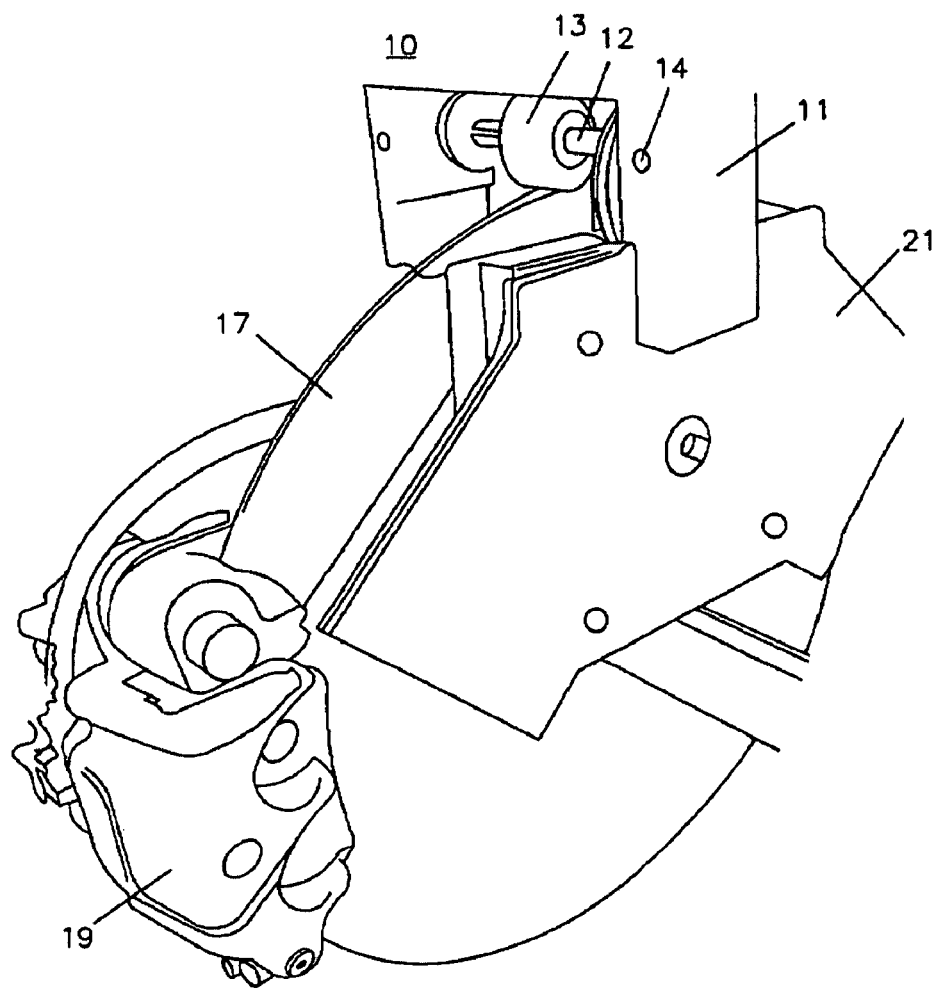
FIG. 1 is a perspective view of a disc brake assembly having features of the invention.

The following discussion describes in detail one embodiment of the invention and several variations of that embodiment. This discussion should not be construed, however, as limiting the invention to those particular embodiments. Practitioners skilled in the art will recognize numerous other embodiments as well.

Referring to FIGS. 1-10, in one aspect of the invention, a system is provided for increasing the air flow to a disc brake assembly 10. The system comprises a main housing 11 and a drive shaft 12. The drive shaft 12 is positioned to be powered by a rotor 17 from the disc brake assembly 10. The disc brake assembly 10 further comprises at least one impeller 15, the impeller 15 is positioned to be powered by the drive shaft 12 and is capable of being rotated to draw airflow from the rotor 17. The disc brake assembly 10 still further comprises at least one impeller housing 21. The impeller housing 21 is adapted to house the impeller 15 and can define an airflow inlet 22 and an airflow outlet 23. The airflow outlet 23 is typically positioned so that exiting airflow is directed to cool the rotor 17 of the disc brake assembly 10.

In this aspect of the invention, typically at least one filter 24 or 25 is operably provided within the system to capture and retain waste particle discharge from brake pads 18 used in the disc brake assembly 10. In one embodiment of this aspect of the invention, an inlet filter 24 is provided within the air inlet 22 and an outlet filter 25 is provided in the air outlet 23.

FIG. 1 illustrates one embodiment of this aspect of the invention. The components of the disc brake assembly 10 are typically retained within a housing 11. The housing 11 is typically attached to a baffle plate 16 that is disposed in the brake assemblies of most motor vehicles. In other embodiments, the housing 11 can be bolted to the brake caliper 19. In yet another embodiment of the invention, the housing 11 can be designed to encompass the caliper 19 to maximize the amount of airflow from the rotor 17 that can be recycled and the amount of brake pad waste particles captured. The housing 11 is designed to fit over the rotor 17. The housing 11 holds the drive shaft 12, drive shaft rollers 13, floating bearings 14 and the impeller 15. The impeller 15 is held within an impeller housing 21. In one embodiment, the disc brake assembly 10 is designed to have an impeller housing 21 on each side of the rotor 17.

Figure 2:
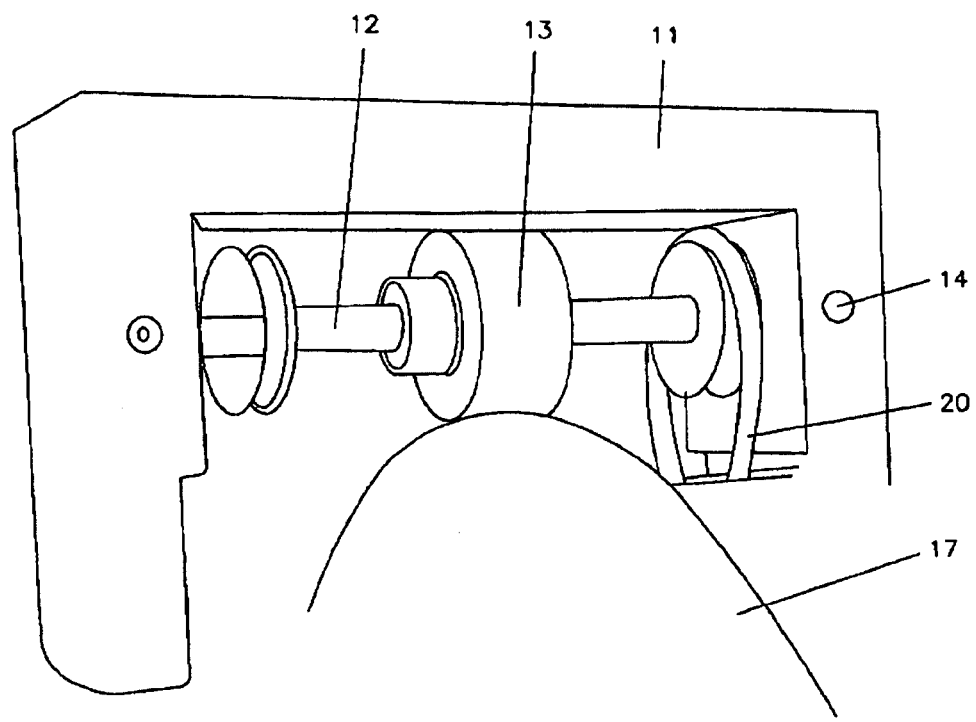
FIG. 2 is an exploded view of a drive shaft useable in a disc brake assembly having features of the invention.
Figure 4:
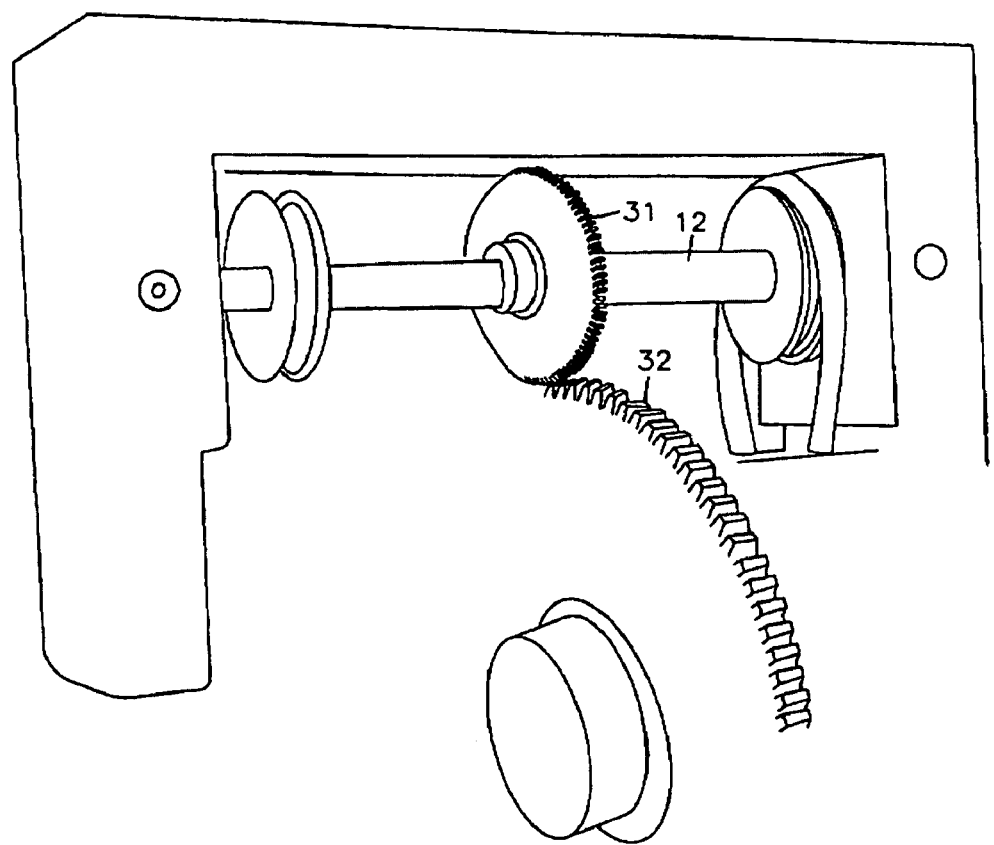
FIG. 4 is an exploded view of a drive shaft in an alternative embodiment of a disc brake assembly having features of the invention.

Referring now to FIG. 2, an exploded view of the drive shaft 12 is shown. The drive shaft 12 is held in the housing 11 and is attached to the housing 11 using floating bearings 14. The floating bearing unit, which will be described in greater detail blow, allows the drive shaft 12 to be properly positioned under different heat conditions or after wear in the braking system. In the preferred embodiment, the drive shaft 12 utilizes a roller 13 to contact the rotor 17. When a vehicle wheel turns, the rotor 17 will be rotated in the same direction the wheel rotates and in turn will contact the roller 13. The roller 13 will then turn the drive shaft 12 in the opposite direction of the rotor 17. As will be described later, the drive shaft 12 will be used to power the impellers 15 to draw air from the rotor 17. The roller 13 can be constructed from a high temperature silicon compound or any material that can withstand the heat and wear caused by the contact with the rotor 17. It is appreciated that in other embodiments, various methods can be used so that the rotor 17 can power the drive shaft 12. As best seen in FIG. 4, one such alternative embodiment is shown. In this embodiment, there is a direct drive design wherein the rotor 17 and drive shaft 12 are fashioned with gears 31, 32 that contact as the rotor 17 is turned. The direct drive configuration would eliminate the need for a roller attachment.

Figure 3A:
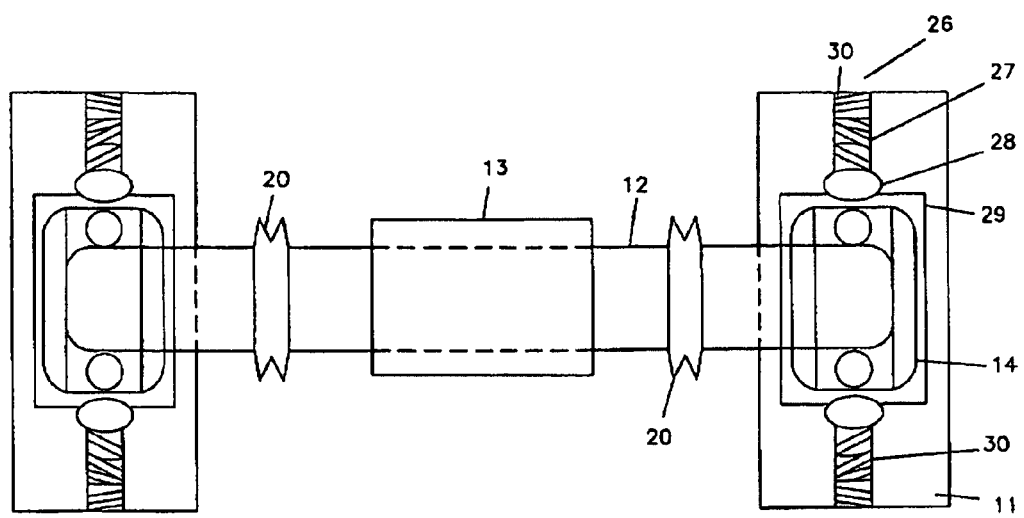
FIG. 3A is a perspective view of a floating bearing useable in a disc brake assembly having features of the invention.
Figure 3B:
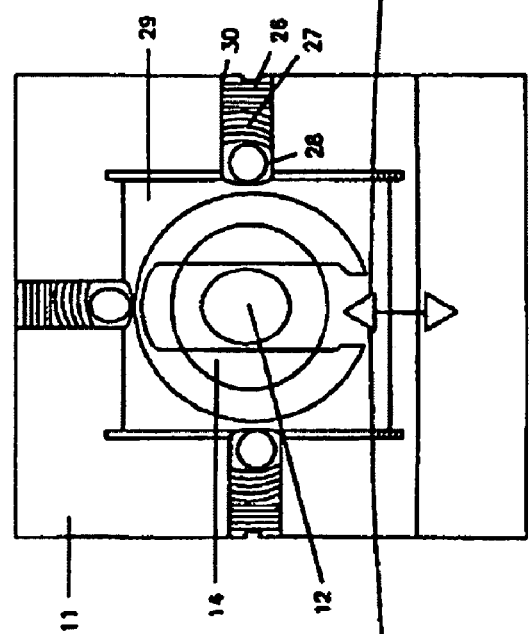
FIG. 3B is a cross-sectional view of the floating bearing illustrated in FIG. 3B.

Referring now to FIGS. 3A and 3B, a floating bearing system for the drive shaft will be described in greater detail. The ends of the drive shaft 12 and bearings 14 are contained in a block 29 which rests in the unit housing 11. As best seen in FIG. 3B, there are machined out channels 30 above and on the sides of the block 29. Inside the channels 30 are ball bearings 28 and springs 27. Set screws 26 are used to contain the unit and place pressure against the springs 27. With the springs 27 holding the block 29 in place, it has the ability to "float" or move along the vertical and horizontal planes. This will allow the system 10 to function effectively under increased heat conditions and even as the brake system wears.

In one embodiment, the drive shaft 12 utilizes a spring belt to contact and turn the impellers 15. It is also appreciated that other methods could be used to transfer power from the drive shaft 12 to the impellers 15. These include a direct design wherein the drive shaft 12 and impellers 15 are fitted with gears that contact as the drive shaft 12 is turned. In addition, a V-belt or chain drive could be utilized to turn the impellers 15. Finally, the gear ratio between the impeller and drive shaft can be adjusted to determine the cubic feet per minute (CFM) of air drawn by the impellers.

Figure 5:
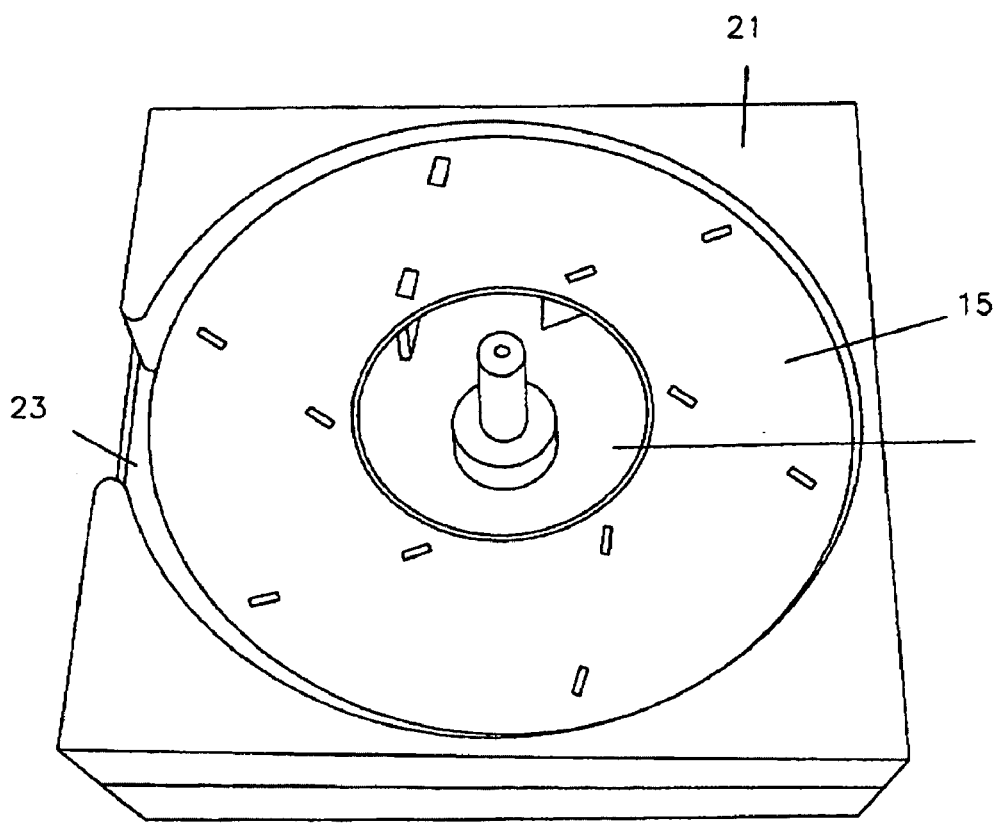
FIG. 5 is an exploded view of an impeller housing useable in one embodiment of a disc brake assembly having features of the invention.
Figure 6A:
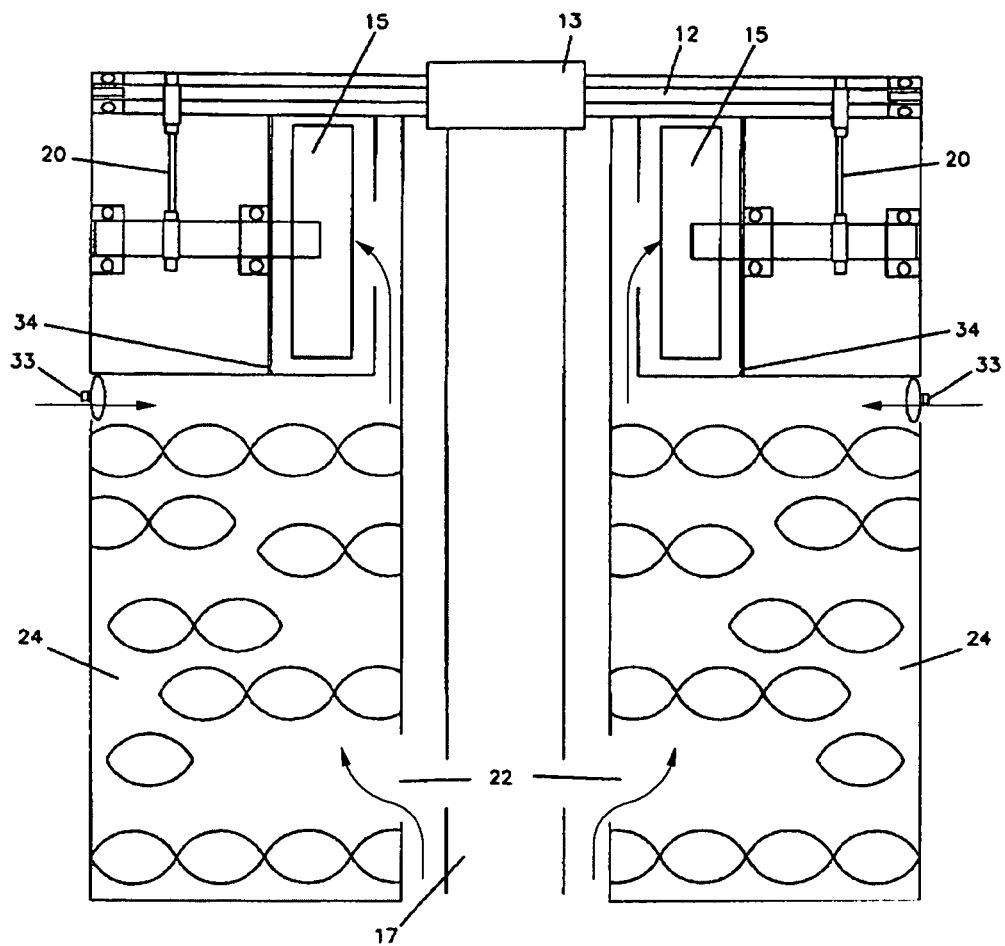
FIG. 6A is a perspective view showing inlet filters useable in an embodiment of a disc brake assembly having features of the invention.
Figure 6B:
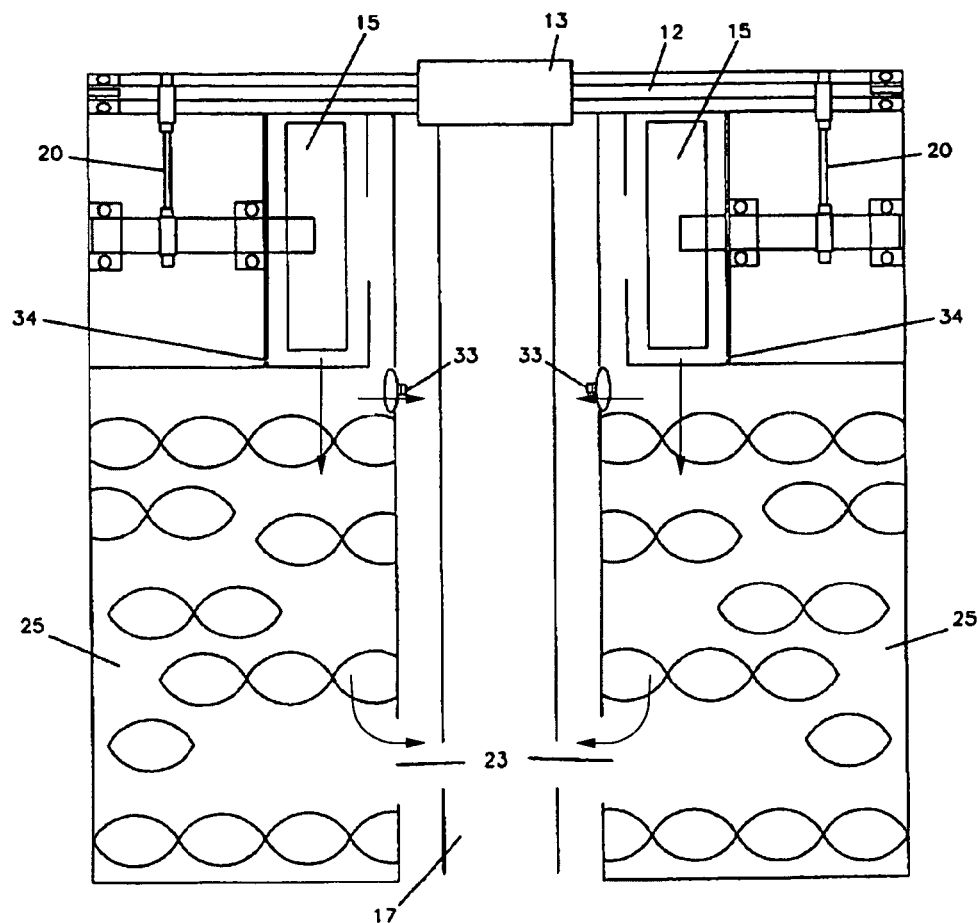
FIG. 6B is a perspective view showing outlet filters useable in an embodiment of a disc brake assembly having features of the invention.

Referring now to FIGS. 5, 6A and 6B, a cross-sectional view of the impeller housing 21 and perspective views showing the filters 24 and 25 are shown. FIG. 6A shows a view showing the inlet filter 24. As seen in FIG. 6B, the identical configuration is used on the other side of the impellers 15 for the outlet filter 25. The impeller housing 21 covers the impellers 15 and has an air inlet 22 and air outlet 23. When the impellers 15 are turned, air will be drawn from the brake rotor 17 into the air inlet 22 of the impeller housing 21. (Note that the flow of air during operation of the embodiments illustrated in the drawings is frequently depicted in the drawings by small arrows.) After air is drawn from the brake rotor 17 into the air inlet 22 of the impeller housing 21, the air will pass through the inlet filter 24, the outlet filter 25, and finally out the air outlet 23 before being directed back onto the brake rotor 17. The impeller housing 21 is also designed to have a pressure release valve 33 on both the air inlet 22 and air outlet 23. If the inlet filter 24 is clogged, the pressure release valve 33 on the air inlet 22 will be opened to allow air to enter the impeller housing 21. Likewise, if the air outlet filter 25 is clogged, the pressure release valve 33 on the air outlet 23 will be opened to allow air to leave the impeller housing. The impeller housing 21 will also be fitted with a small hole 34 so that a small amount of brake dust can be directed onto the drive shaft 12. This minimal amount of brake dust will be used to lubricate the drive shaft 12 to maximize its efficiency. Additionally, the impeller housing 21 can be insulated to reduce the noise from the system.

In one embodiment, the air inlet and air outlet filters 24 and 25 are standard reusable steel or copper mesh filters with a micron filter of approximately 80 microns. It is, however, appreciated that any filter type capable of capturing the particles released from brake pads can be use in the system. Another environmental benefit of the system is that once the filters are cleaned, the brake dust can be recycled.

In one embodiment, one impeller 15 is positioned on either side of the brake rotor 17. In other exemplary embodiments, various configurations can be used to adjust the amount of air drawn from the rotor 17. One such configuration is a twin impeller design. In that configuration, two impellers are used in parallel in each impeller housing 21. By using more than one impeller, the amount of airflow redirected to the brake rotor 17 is increased. Additionally, impellers with curved paddles can be used to reduce the noise from the system.

FIG. 7 shows another embodiment wherein the impeller assembly is also fitted with a reverse centrifugal clutch assembly 35. The centrifugal clutch 35 links the impeller shaft 36 with the power drive from the spring belt 20. The purpose of the reverse clutch 35 is to disengage when the impeller creates an output beyond a set maximum RPM (rotations per minute) and airflow (CFM). This will prevent damage to the assembly which may occur at extreme operating conditions. The clutch 35 consists of an outer drum attached directly to the spring belt shaft 37. The drum holds a pair of cylindrical clutch weights attached to a drum with a pair of springs enclosed in a guide. The springs keep constant pressure on the clutch weights that come in contact with the impeller shaft 36. With the clutch 35 engaged, both the impeller shaft 36 and spring belt shaft 37 work as one. Only at high RPM rates will the clutch 35 disengage and allow the impeller shaft 36 to slow or stop. When the RPMs are reduced, there will be less centrifugal force so that the springs push the clutch weights back up against the impeller shaft 36. This will engage the two shafts 36 and 37 again so that the system 10 can function as previously described.

Figure 8:
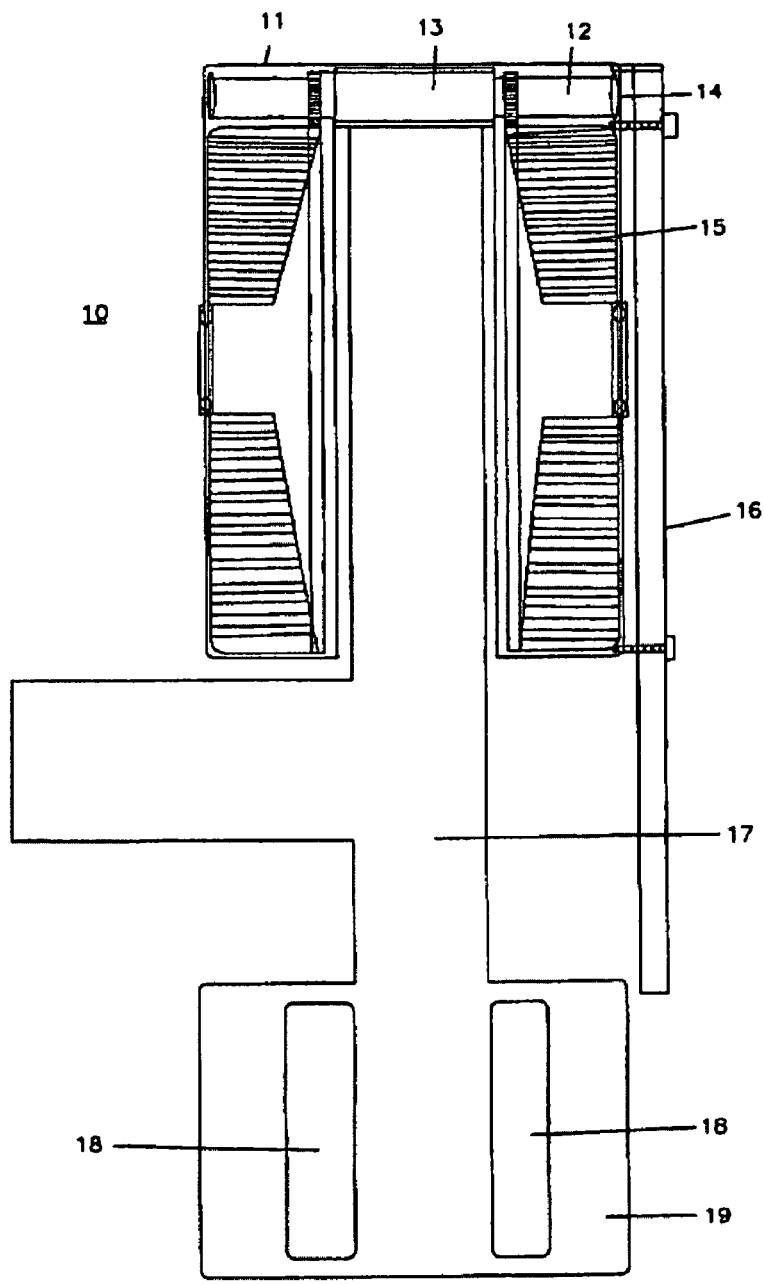
FIG. 8 is a perspective view of a disc brake assembly having features of the invention.

Referring now to FIG. 8, a system for introducing increased airflow in a brake system and collecting brake pad waste will be described. In order to stop the motion of vehicle wheels, disc brake systems are used. Wheels are connected to a brake rotor 17 that turns with the wheels. To slow the movement of the rotor 17 and in turn the wheels, a brake caliper 19 is used. The caliper 19 is fitted with brake pads which are positioned on either side of the brake rotor 17. The caliper is used to press the brake pads 18 against the rotor. The kinetic energy of the rotor 17 is then converted to heat by the friction between the rotor 17 and the brake pads 18. As the brake pads 18 wear, particles are released from the pads. This "brake dust" comprises the waste particles that are collected by the filters 24 and 25.

As the rotor 17 is turned, the drive shaft 12 is engaged and is powered by the rotation of the rotor 17. The drive shaft 12 in turn powers the impellers 15. The rotation of the impellers 15 creates a suction that draws the air and brake dust from the rotor into the impeller housing 21. Once in the impeller housing 21, the airflow is moved through both the inlet and outlet filters 24 and 25. These filters capture the brake dust particles so that it is not released into the atmosphere or deposited on the vehicle wheels. The airflow is then directed out of the impeller housing 21 and back onto the brake rotor 17. This increased airflow onto the rotor 17 will act to cool the braking system and increase the overall brake efficiency of the vehicle brakes.

Referring now to FIGS. 9-26, in another aspect of the invention, a disc brake assembly 110 is provided which comprises a rotor 112, a caliper 114 and brake pads 116 attached to the caliper 114. In this aspect of the invention, the disc brake assembly 110 further comprises a filter 118 disposed within a shroud 120.

The shroud 120 has a pair of opposed side walls 122 which define a shroud interior 124 and a pair of opposed shroud end openings 126. The filter 118 is disposed within the shroud 120 to capture and retain waste particles discharged from the brake pads 116. Typically, a shroud 120 is disposed on both sides of the rotor 112.

FIGS. 9 and 10 illustrate a disc brake assembly 110 having features of the invention. The disc brake assembly 110 comprises a caliper housing 128 which retains therein the brake caliper 114. The disc brake assembly 110 is attached to the wheel of a motor vehicle having a hub 130. FIG. 10 illustrates the internals of the caliper housing 128, including the opposed hydraulic cylinders 132 of the caliper 114 which are supported from a frame 134. As in all disc brake assemblies, the hydraulic cylinders 132 act upon opposite sides of the rotor 112 through disc pads 116 to slow the rotation of the rotor 112 by pressing the disc pads 116 against the periphery of the rotor 112.

FIG. 11 illustrates the use of the shroud 120 in connection with the disc brake assembly 110. The shroud 120 is disposed in close proximation to the rotor 112 and covers at least about 70% of a distal side periphery 136 of the rotor 112. (As used herein, the percentage given to the amount of coverage of the shroud 120 of the periphery of the rotor 112 is intended to be understood to be a percentage of the radius of the rotor 112. Thus, a shroud 120 which covers 75% of the periphery of a rotor 112 covers 270° of the full 360° of the rotor 112.)

The shroud 120 is disposed in close proximity to the rotor 112. Typically, the spacing between the shroud 120 and the rotor 112 is not less than the thickness of the brake pads 116 on each side of the rotor 112 within the caliper 114. Thus, the spacing between the shroud 120 and the rotor 112 is typically less than about 7 mm. The shroud 120 can be attached to the disc brake assembly 110 such that the shroud 120 floats with the caliper 114. In such embodiments, the spacing between the shroud 120 and the rotor 112 stays the same as the brake pad 116 wears out with time.

In the embodiment illustrated in FIG. 11, one of the shroud side walls 122 defines a pair of shroud wall openings 138 with a shroud wall impeller 140 disposed over each shroud wall opening 138. The shroud wall impellers 140 are used to forcibly draw air from the shroud interior 124.

Also illustrated in FIG. 11 is the use of a pair of brake pad fans 142 disposed proximate to a brake pad 116 and proximate to each of the shroud end openings 126. Such brake pad fans 142 are used to force air to the brake pad 116 and to force air into the shroud interior 124.

In the embodiment illustrated in FIG. 11, drain openings 144 are defined in the lowermost portion of the shrouds 120 to facilitate the drainage of any moisture within the shroud interior 124, especially if the shroud 120 becomes fully immersed.

Figure 12:
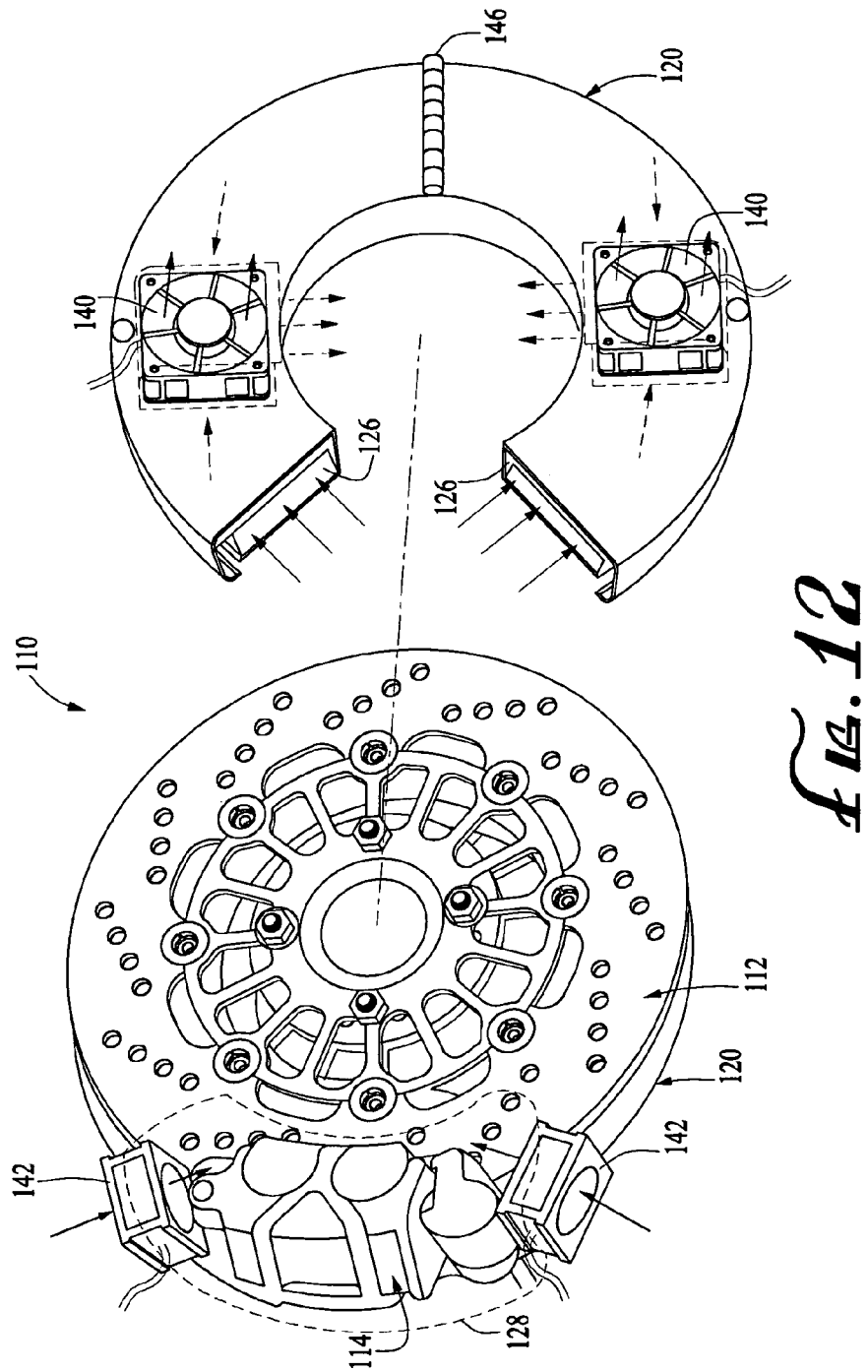
FIG. 12 is an exploded perspective view of another embodiment having features of the invention.

FIG. 12 is an exploded view which illustrates one of shrouds 120 disposed separate from the rest of the disc brake assembly 110. In this embodiment, the outer side wall 122 of the separated shroud 120 includes a hinge 146 so that the outer side wall 122 of the shroud 120 can be alternatively opened and closed in clam-shell fashion to inspect and/or replace the filter 118 disposed within the shroud 120.

Figures 13, 14:
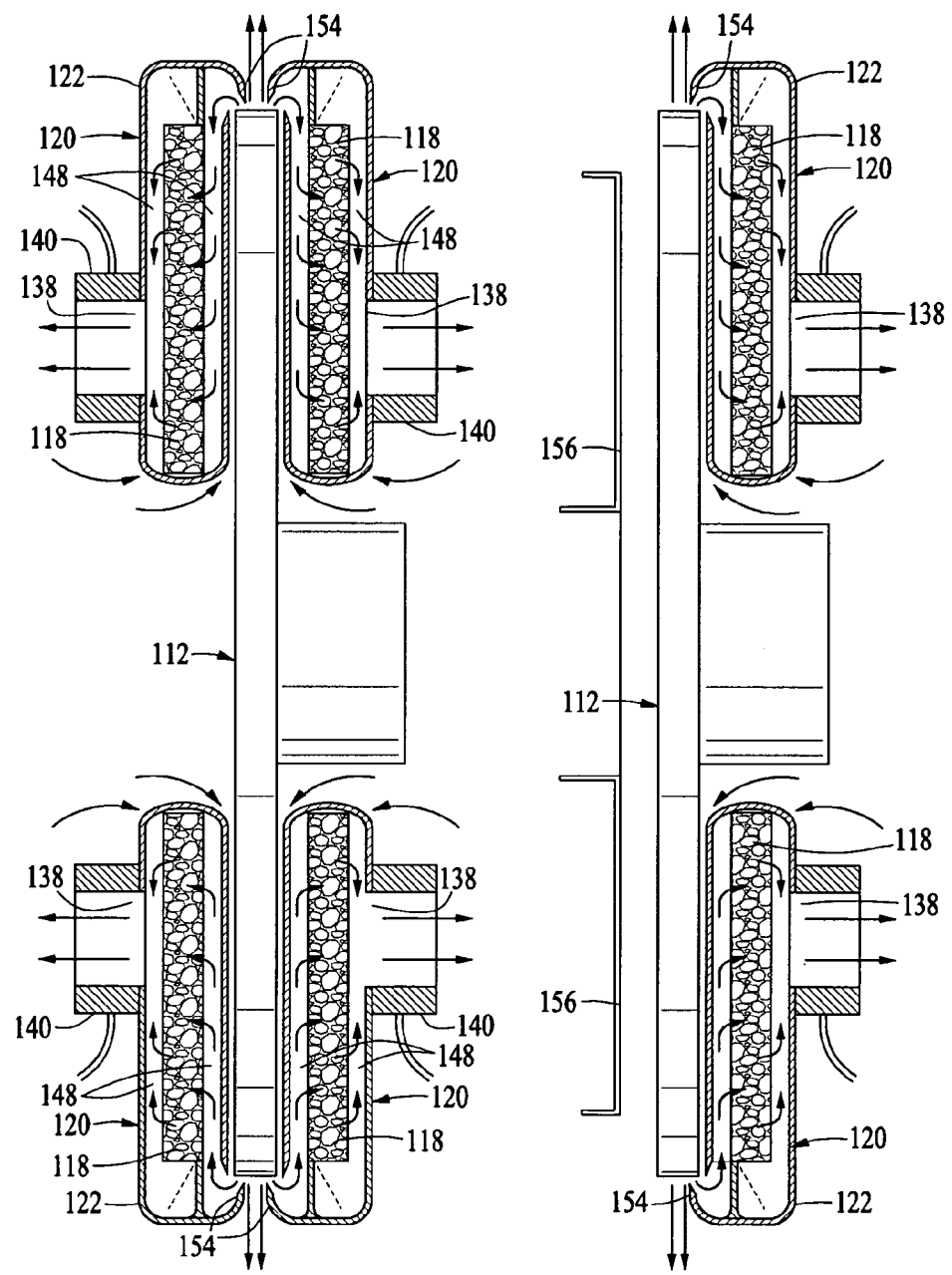
FIG. 13 is a cross-sectional view of the embodiment illustrated in FIG. 11 taken along line 13-13.
FIG. 14 is a cross-sectional view of an alternative embodiment to that which is illustrated in FIG. 13.

FIG. 13 is a cross-sectional view of the embodiment illustrated in FIG. 11. FIG. 13 illustrates that a pair of opposed plenums 148 can be defined on either side of each filter 118 to provide flow access to the filters 118 along the entire length of the filters 118. Pressure release mechanisms 150, such as pressure release valves 152, are preferably disposed within the shrouds 120 to allow air to bypass the filters 118 should the filters 118 become clogged. In the drawings, such pressure release mechanisms 150 are shown diagrammatically as short dashed lines.

As can be seen in FIG. 13, some of the airflow generated by the rotor 112 escapes between the two shrouds 120, and some of the airflow generated by the rotor 112 is directed by lips 154 on the shrouds 120 to the shroud interiors 124. Such airflow carries both heat and waste particles away from the brake pads 116.

FIG. 14 illustrates an alternative embodiment to the embodiment illustrated in FIG. 13 wherein the vehicle comprises a backing plate 156 proximate to the inner side of the rotor 112. Because of this backing plate 156, the embodiment illustrated in FIG. 14 comprises only a single shroud 120.

FIGS. 11A and 13A illustrate another alternative embodiment wherein each shroud 120 comprises a radially inward filter 158 and a separate radially outward filter 160. In the embodiment illustrated in FIGS. 11A and 13A, about half of the air flowing into the shroud 120 passes through the radially inward filter 158 and about half passes through the radially outward filter 160.

Figure 15:
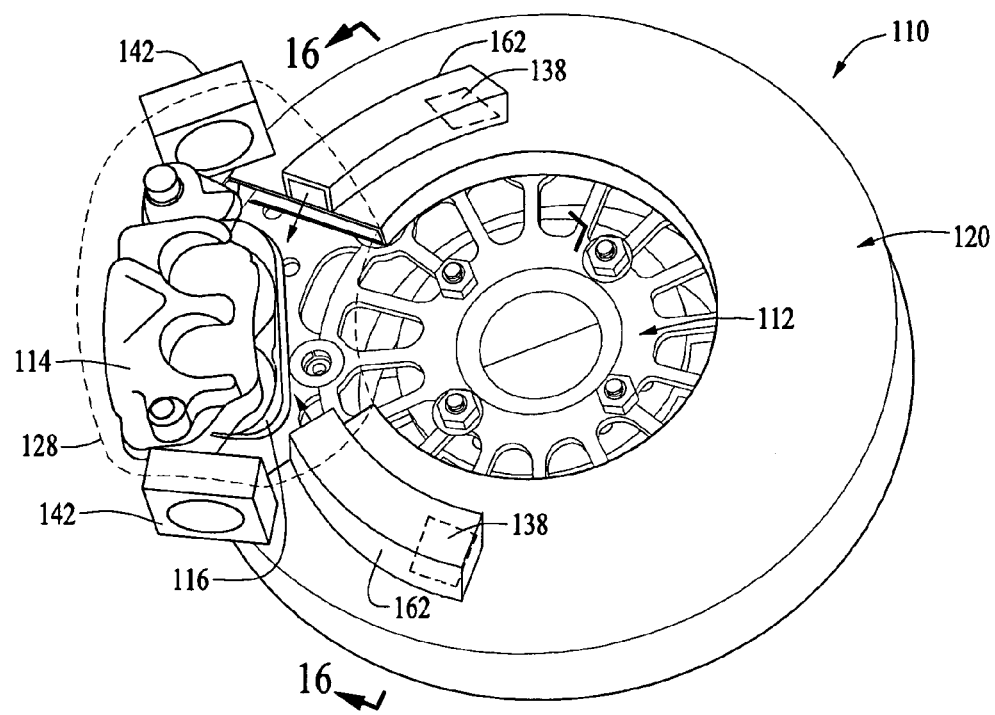
FIG. 15 is a perspective view of another embodiment having features of the invention.
Figure 16:
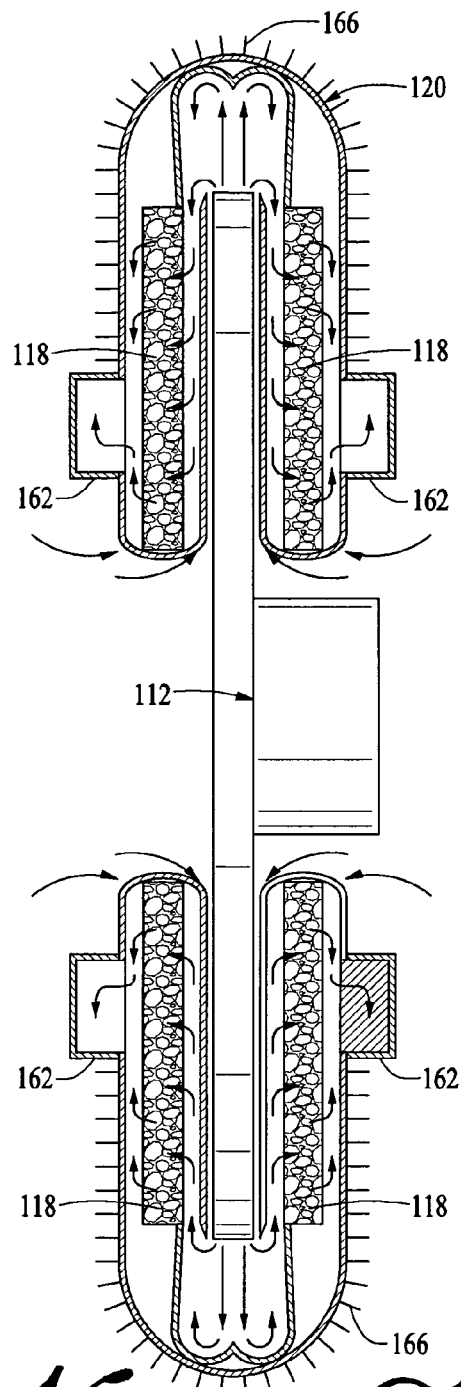
FIG. 16 is a cross-sectional view of the embodiment illustrated in FIG. 15 taken along line 15-15.

FIGS. 15 and 16 illustrate an embodiment wherein one of the shroud side walls 122 defines a pair of shroud wall openings 138. Disposed in fluid communication with each shroud wall opening is a duct 162 adapted to direct airflow out of the shroud interior 124 and towards the brake pads 116. In this embodiment, a single shroud 120 not only covers at least one of the distal side peripheries 136 of the rotor 112, but also covers at least about 70% of the distal edge periphery 164 of the rotor 112. In this design, the rotation of the rotor 112 acts as the exclusive impeller to drive air through the shroud interior 124 and then back out through the ducts 162 towards the brake pads 116.

Figure 17:
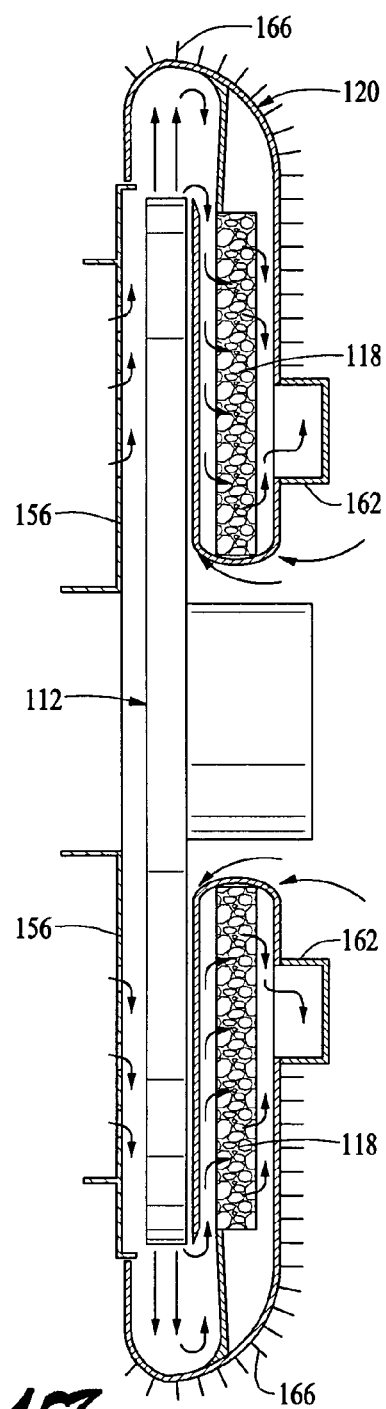
FIG. 17 is a cross-sectional view of an alternative embodiment to that which is illustrated in FIG. 16.

FIG. 17 is an alternative embodiment to that which is illustrated in FIGS. 15 and 16. In the embodiment illustrated in FIG. 17, the vehicle wheel comprises a backing plate 156 and the shroud 120 cooperates with the backing plate 156 to enclose the distal edge periphery 164 of the rotor 112.

FIGS. 16 and 17 also illustrate the fact that the shroud 120 can comprise optional cooling fins 166 disposed along the exterior side wall 122 of the shroud 120.

Figure 18:
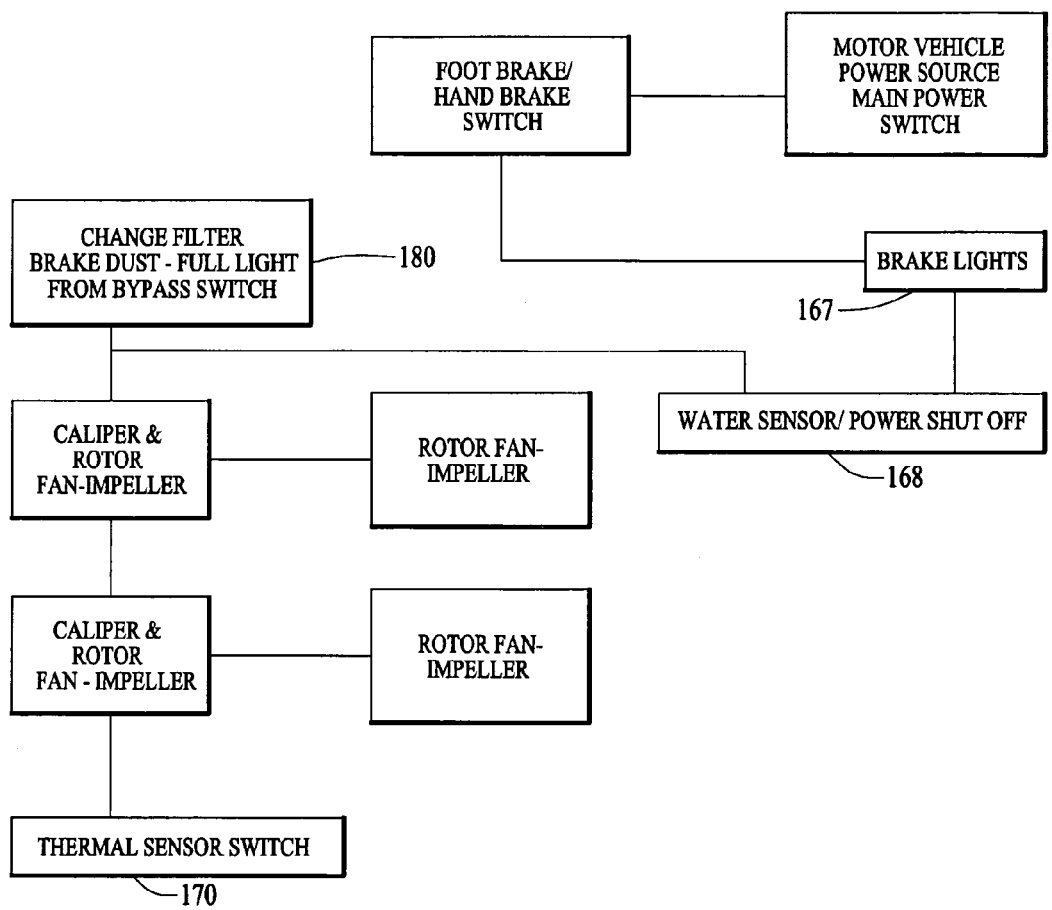
FIG. 18 is a control diagram illustrating features of the invention.

FIG. 18 illustrates a control scheme which can be used in the operation of the invention. In one aspect of this control scheme, when the braking action of the disc brake assembly 110 is initiated, electrical power flowing to the vehicle's brake lights 167 also provides power to each of the brake pad fans 142.

Also as indicated in FIG. 18, a water sensor 168 can be used in the invention to automatically shut off power to the impellers 140 and the brake pad fans 142 when moisture is detected within the housing 128, and to indicate same to the motor vehicle operator. Once moisture is no longer detected within the housing 128, the brake pad fans 142 are again allowed to turn on when braking action is initiated. Such water sensor 168 protects the brake pad fans 142 in the event of inadvertent total submersion.

Also as indicated in FIG. 18, a thermal sensor switch 170 can be used to detect excess heat within the housing 128 above a predetermined set temperature. The thermal sensor switch 170 can be adapted to automatically activate the brake pad fans 142 to cool the disk brake assembly 110 even without having to initiate braking action. Once the temperature in the housing 128 falls below the set temperature, the brake pad fans 142 are caused to stop and return to normal operation.

FIG. 19 illustrates an embodiment of the invention wherein a drive shaft roller 172 in contact with the rotor 112 is used to drive a shroud wall impeller 140 which forces air through the shroud 120.

Figure 20:
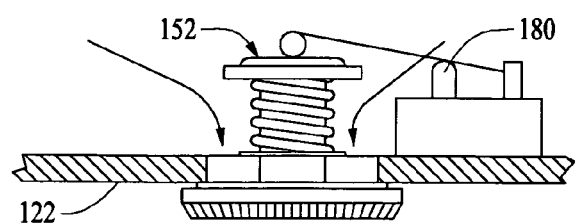
FIG. 20 is perspective view of another embodiment having features of the invention.

FIG. 20 is an alternative embodiment to that which is illustrated in FIG. 19. In the embodiment illustrated in FIG. 20, an impeller drive fan 176 is disposed proximate to the rotor 112 and is caused to rotate by air currents developed by the rotation of the rotor 112. Thus, in this embodiment, the impeller drive fan 176 is indirectly rotated by the rotor 112. The impeller drive fan 176 is operatively linked to a shroud wall impeller 140 adapted to force air through the shroud 120.

FIG. 21 illustrates an embodiment to that which is illustrated in FIG. 20. In this embodiment, the impeller drive fan 176 is attached directly to the shroud wall impeller 140.

FIG. 22 is a cross-sectional side view which illustrates another embodiment of the invention wherein the rotation of the rotor 112 is the exclusive driving force for forcing air through the shroud 120.

FIG. 23 illustrates an alternative embodiment to that which is illustrated in FIG. 21. In FIG. 23, the impeller drive fan 176 is used to drive two opposed shroud wall impellers 140.

Figure 24:
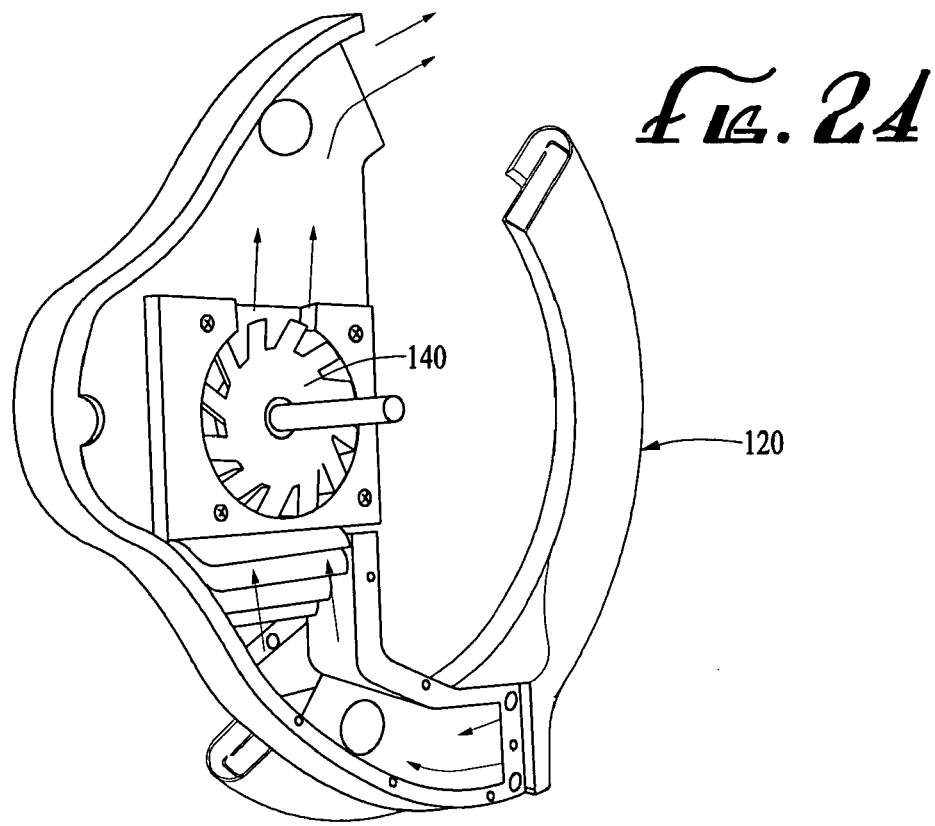
FIG. 24 is a perspective detail view of an impeller assembly useable in the invention.

FIG. 24 illustrates the use of a shroud wall impeller 140 to drive air through the shroud 120 in an embodiment similar to that which is illustrated in FIGS. 19-23.

Figure 25:
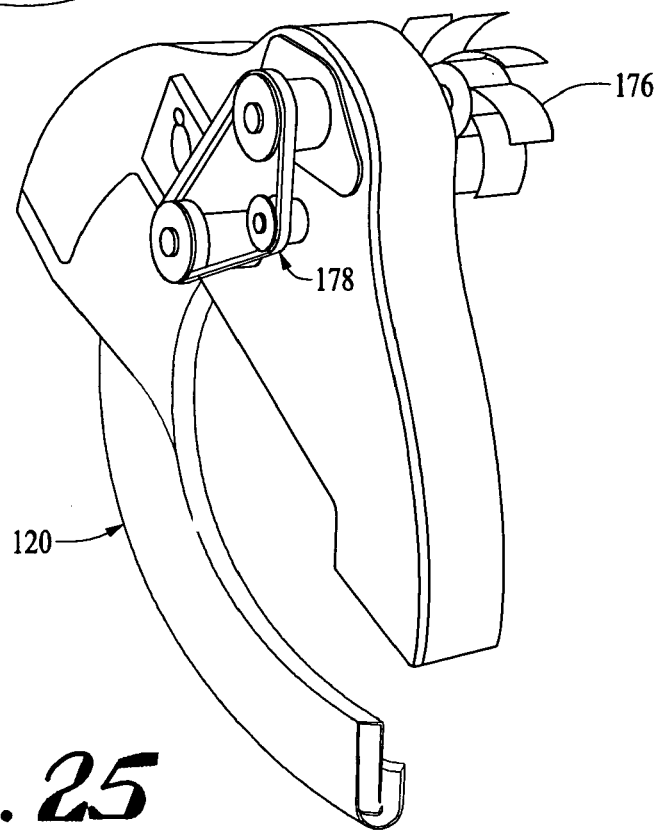
FIG. 25 is a perspective detail view of another impeller assembly useable in the invention.

FIG. 25 illustrates an alternative embodiment to that which is illustrated in FIG. 21. In the embodiment illustrated in FIG. 25, the impeller drive fan 176 is used to drive a shroud wall impeller 140 via a spring belt or V-belt linkage 178.

FIG. 26 illustrates a typical pressure release valve 152 disposed within the side wall 122 of a shroud 120 for releasing pressure within the shroud interior 124 should pressure within the shroud interior 124 unduly build up for any reason. As illustrated in FIG. 26, the pressure release valve 152 can comprise a microswitch 180 adapted to send a signal to a suitable indicator to alert the user that the pressure release valve 152 has opened and that the filter 118 is probably in need of changing.

Having thus described the invention, it should be apparent that numerous structural modifications and adaptations may be resorted to without departing from the scope and fair meaning of the instant invention as set forth hereinabove and as described hereinbelow by the claims.

What is claimed is:

1. A disc brake assembly comprising:
   a rotor that is turned by motion of a vehicle;

a caliper and brake pads attached to the caliper;

the rotor having an inside face periphery, an outside face periphery and an outside diameter periphery;

a filter disposed within a shroud;

the shroud having a pair of opposite side walls, opposed shroud end openings and a shroud interior;

the shroud being disposed proximate to the rotor so as to cover at least about 70% of at least one of the inside face and the outside face peripheries wherein the shroud houses a radially inner filter and a radially outer filter, and wherein when said vehicle is in motion, rotation of said rotor moves brake dust into said radial inner filter and said radially outer filter.

2. The disc brake assembly of claim 1 wherein the disc brake assembly comprises a pair of filters, each disposed within a shroud, each shroud having a pair of opposite side walls, opposed shroud end openings and a shroud interior, each shroud being disposed proximate to the rotor, on opposite sides of the rotor, so that the two shrouds cover at least about 70% of both of the distal side peripheries.

3. The disc brake assembly of claim 1 wherein the rotor is the exclusive driving force for forcing air through the shroud.

4. The disc brake assembly of claim 1 wherein the shroud covers at least about 70% of the distal edge periphery wherein one of the shroud side walls defines an opening with a duct disposed in fluid communication therewith to direct air flowing out of the shroud to the brake pads.

5. The disc brake assembly of claim 1 wherein the shroud defines a pair of plenums disposed on opposite sides of the filter.

6. The disc brake assembly of claim 1 wherein one of the shroud side walls defines an opening with an impeller disposed thereover to forcibly draw air from the shroud interior.

7. The disc brake assembly of claim 1 wherein a brake pad fan is disposed proximate to the brake pads and proximate to at least one of the shroud end openings, to force air to the brake pads and to force air into the shroud interior.

8. The disc brake assembly of claim 1 wherein said shroud further includes at least one pair of lips located in proximity to the outer radius of the rotor.

9. The disc brake assembly of claim 8 wherein said lips directs airflow generated by said rotor to said shrouds interior.

10. The disc brake assembly of claim 9 wherein said airflow carries both heat and waste particles away from the brake pads.

11. The disc brake assembly of claim 8 wherein said lips directs some airflow generated by said rotor out of said shrouds interior.

12. The disc brake assembly of claim 8 wherein said lips directs airflow out of said shroud and retains at least some of said waste material back into said shroud interior.

13. The disc brake assembly of claim 1 wherein said assembly can be designed to cover said caliper and said brake pads.

14. The disc brake assembly of claim 1 wherein said filter is replaceable, changeable or cleanable.

\* \* \* \* \*